US008863224B2

(12) United States Patent
Hecht et al.

(10) Patent No.: US 8,863,224 B2
(45) Date of Patent: Oct. 14, 2014

(54) SYSTEM AND METHOD OF MANAGING DATA PROTECTION RESOURCES

(75) Inventors: Gil Hecht, Moshav Nir (IL); Doron Pinhas, Shoham (IL); Doron Gordon, Kadima (IL)

(73) Assignee: Continuity Software Ltd., Hertzlia (IL)

( * ) Notice: Subject to any disclaimer, the term of this patent is extended or adjusted under 35 U.S.C. 154(b) by 1512 days.

(21) Appl. No.: 12/125,564

(22) Filed: May 22, 2008

(65) Prior Publication Data

US 2008/0282321 A1 Nov. 13, 2008

Related U.S. Application Data

(63) Continuation of application No. PCT/IL2006/001353, filed on Nov. 23, 2006.

(60) Provisional application No. 60/739,416, filed on Nov. 25, 2005.

(51) Int. Cl.
*H04L 29/06* (2006.01)
*G06F 21/60* (2013.01)

(52) U.S. Cl.
CPC ...... *G06F 21/604* (2013.01); *G06F 2221/2101* (2013.01)
USPC .................. 726/1; 713/161; 713/165; 726/26

(58) Field of Classification Search
CPC ........ H04L 63/20; H04L 63/123; G06F 21/10
USPC ............................................. 713/161; 726/1
See application file for complete search history.

(56) References Cited

U.S. PATENT DOCUMENTS

| 7,383,577 | B2 * | 6/2008 | Hrastar et al. .................. 726/23 |
| 7,523,277 | B1 * | 4/2009 | Kekre et al. .................... 711/162 |
| 7,702,667 | B2 * | 4/2010 | Yahalom et al. ............... 707/611 |
| 2002/0138416 | A1 | 9/2002 | Lovejoy et al. |
| 2003/0101341 | A1 * | 5/2003 | Kettler et al. .................. 713/162 |
| 2003/0154269 | A1 | 8/2003 | Nyanchama et al. |
| 2003/0225801 | A1 * | 12/2003 | Devarakonda et al. ....... 707/205 |

(Continued)

FOREIGN PATENT DOCUMENTS

| EP | 1 526 679 A1 | 4/2005 |
| GB | 2 372 594 A | 8/2002 |
| WO | WO 2004/104793 A2 | 12/2004 |

OTHER PUBLICATIONS

Coleman, "Security Policy Compliance Management," Annual Review of Communications, National Engineering Consortium, Jan. 1, 2005, pp. 15-24, vol. 58 (XP-001520450).

(Continued)

*Primary Examiner* — Mohammad L Rahman
(74) *Attorney, Agent, or Firm* — Oliff PLC

(57) ABSTRACT

Herewith disclosed a method and system for computerized managing a plurality of data protection (DP) resources. The computerized management comprises obtaining data related to at least part of the DP resources among said plurality of DP resources, wherein at least part of data is obtained by automated collecting; accommodating the obtained data in a data repository thus giving rise to accommodated data; processing the accommodated data, said processing resulting in at least one of the following: a) identifying one or more data protection (DP) schemes characterizing DP resources and/or relationship thereof; and b) identifying one or more data protection (DP) gaps.

17 Claims, 8 Drawing Sheets

(56) References Cited

U.S. PATENT DOCUMENTS

| | | |
|---|---|---|
| 2004/0064436 A1 | 4/2004 | Breslin et al. |
| 2004/0153708 A1 | 8/2004 | Joshi et al. |
| 2004/0221049 A1 | 11/2004 | Blumenau et al. |
| 2004/0243699 A1 | 12/2004 | Koclanes et al. |
| 2005/0027723 A1* | 2/2005 | Jones et al. ............ 707/100 |
| 2005/0144062 A1 | 6/2005 | Mittal et al. |
| 2005/0183143 A1* | 8/2005 | Anderholm et al. ........... 726/22 |
| 2006/0074993 A1 | 4/2006 | Pulamarasetti et al. |
| 2006/0224550 A1* | 10/2006 | Gopisetty et al. ............. 707/1 |
| 2006/0224742 A1* | 10/2006 | Shahbazi ................. 709/226 |
| 2006/0230076 A1* | 10/2006 | Gounares et al. ............ 707/200 |
| 2007/0180490 A1 | 8/2007 | Renzi et al. |
| 2008/0010233 A1* | 1/2008 | Sack et al. .................... 707/1 |

OTHER PUBLICATIONS

European Search Report dated Oct. 12, 2010 issued in European Patent Application No. 06821573.0.

\* cited by examiner

SYSTEM AND METHOD OF MANAGING DATA PROTECTION RESOURCES

This is a Continuation of International Application No. PCT/IL2006/001353 filed Nov. 23, 2006, which claims the benefit of U.S. Provisional Application No. 60/1739,416 filed Nov. 25, 2005. The disclosure of the prior application is hereby incorporated by reference herein in its entirety.

FIELD OF THE INVENTION

This invention relates to a field of data protection and, in particular, to systems and methods of managing data protecting resources.

BACKGROUND OF THE INVENTION

Large enterprises are investing significant resources to maintain valid and functional data protection (DP) solutions in place. Data protection can entail various approaches and methodologies, including backup, archiving, disaster recovery, high availability, business continuity and others in accordance with an enterprise's business protection requirements and the budget available. Users are looking for a solution that will help to verify that critical data elements are protected, and DP configuration can provide a reliable and safe switch to redundant computing resources in case of an unexpected disaster or service disruption.

The problem was recognized in the Prior Art and various systems were developed to provide a solution, for example:

US Patent Application No. 2004/64,436 (Breslin, Jodi et al.) published Apr. 1, 2004 and entitled "System and method for managing business continuity" discloses a system and method for developing, assessing testing and implementing plans and procedures for managing crisis events and providing continuity to business operations in cases of business interruption. Such business interruption can occur due to a variety of reasons including physical facility emergency. The continuity in business operations relates at least to real estate, and critical business resources such as computers, databases and applications. The system includes a core repository that manages, monitors and measures all core continuity processes across an institution (e.g., a corporation). Once an emergency has been identified, the system links the continuity plans to crisis team initiatives across the corporation. The system provides an executive level 'state of health' reporting facility to enable executives (managers) to assess the state of the business and the execution of the continuity plans in real time.

US Patent Application No. 2004/153,708 (Joshi, Darshan B. et al.) published Aug. 5, 2004 and entitled "Business continuation policy for server consolidation environment" discloses a method, computer program product and system that establishes and maintains a business continuity policy in a server consolidation environment. Business continuity is ensured by enabling a high availability of applications. When an application is started, restarted upon failure, or moved due to an overload situation, a system is selected best fulfilling the requirements for running the application. These requirements can include application requirements, such as an amount of available capacity to handle the load that will be placed on the system by the application. These requirements can further include system requirements, such as honoring a system limit of a number of applications that can be run on a particular system. Respective priorities of applications can be used to determine whether a lower-priority application can be moved to free resources for running a higher-priority application.

US Patent Application No. 2004/221,049 (Blumenau, Steve, et al.) published Nov. 4, 2004 and entitled "Method and apparatus for identifying network devices on a storage network" discloses a method and apparatus for managing the availability and assignment of data in a storage system that is coupled to a network. A user interface is provided that executes on a host processor that is coupled to the storage system over the network. The user interface communicates with a configuration database in the storage system to identify host processors that are logged into the storage system over the network, to identify storage volumes on the storage system, to identify whether access to a particular storage volume on the storage system is permitted from a particular host processor, and to identify a network path by which host processors are logged into the storage system over the network. In one embodiment, a graphical user interface is provided that can be used to graphically represent host processors, host bus adapters, storage systems, and storage system adapters and storage volumes on the storage system. The graphical representation provided by the graphical user interface permits a user to graphically view a topology of the network at varying levels of detail, selectable by the user. The graphical user interface also permits a user to allow or deny access to storage systems or a particular storage volume on storage system from one or more of the host processors, host bus adapters, etc., by selecting and manipulating graphical representations thereof.

US Patent Application No. 2004/243,699 (Kocklanes Mike; et al) published Dec. 2, 2004 and entitled "Policy based management of stored resources" discloses a system and method of policy based management wherein service level objectives are associated with storage resource requesters such as applications. A set of policy rules is established in connection with these service level objectives. An update of the configuration of the storage network, such as a provisioning of storage resources for the application, is performed according to a workflow that implements the policy rules, which allows the service level objectives of the application to be automatically satisfied by the new provisioning. Metrics are used to ensure that service level objectives continue to be met.

US Patent Application No. 2005/144,062 (Mittal, Manish M.; et al.) published Jun. 30, 2005 and entitled "Business continuity information management system" discloses a system for implementing a corporate business continuity plan in which a plurality of governance rules are maintained and updated for one or more business locations. The governance rules establish business continuity responsibilities that are, in turn, assigned to designated employees for periodic or occasional action. Each designated employee is responsible for performing their assigned business continuity responsibilities and submitting statuses of such responsibilities to the system according to established timelines. One or more business continuity readiness indicators are then generated, based on the submitted statuses.

US Patent Application 2006/74,993 (Mulpuri Rajasekhar et al.) published Jun. 4, 2006 and entitled "System and method for management of recovery time objectives of business continuity/disaster recovery IT solutions" discloses a system and method for management of Recovery Time Objective (RTO) of a business continuity or disaster recovery solution. The system comprises a management server logically coupled with at least a first computer, at least a second computer, and a network coupling the first and the second computers. The first and second computers host at least one continuously available application, at least one data protection scheme for replicating the application data and at least one operating system; the application data being periodically replicated from the first computer to at least the second computer. The system manages RTO by inputting an RTO value for the solution, calculating a real time RTO value for the solution, and making the real time RTO value less than or equal to the input RTO value.

European Patent Application 1,526,679 (Leberre, Philippe) published Apr. 27, 2005 and entitled "Methods relating to the monitoring of computer systems" discloses a method of monitoring the condition of a computer system, comprising receiving performance data from the system, processing the data to estimate the likelihood of a deterioration in the condition of the system and providing an output which is dependent upon the estimated likelihood.

SUMMARY OF THE INVENTION

In accordance with certain aspects of the present invention, there is provided a method of computerized managing a plurality of data protection (DP) resources, the method comprising:
 a) obtaining data related to at least part of the DP resources among said plurality of DP resources, wherein at least part of data is obtained by automated collecting;
 b) accommodating the obtained data in a data repository thus giving rise to accommodated data;
 c) processing the accommodated data, said processing resulting in at least one finding selected from a group comprising:
  i) identifying one or more data protection (DP) schemes characterizing DP resources and/or relationship thereof; and
  ii) identifying one or more data protection (DP) gaps.

In accordance with other aspects of the present invention, there is provided a system for computerized managing a plurality of data protection (DP) resources, the system comprising:
 a) means for obtaining data related to at least part of the DP resources among said plurality of DP resources, wherein at least part of data is obtained by automated collecting;
 b) a data repository accommodating the obtained data thus giving rise to accommodated data;
 c) a processor adapted to process the accommodated data, said processing resulting in at least one finding selected from a group comprising:
  i) identifying one or more data protection (DP) schemes characterizing DP resources and/or relationship thereof; and
  ii) identifying one or more data protection (DP) gaps.

In accordance with other aspects of the present invention, there is provided a method of processing data related to DP resources and a processor thereof, said processing comprising:
 a) running at least one rule for identifying one or more data protection (DP) schemes characterizing DP resources and/or relationship thereof; and
 b) running at least one rule for identifying one or more DP gaps, wherein at least one gap is characterized by a gap profile and is identified by matching said gap profile to at least one identified DP scheme.

In accordance with further aspects of the present invention at least one DP gap is characterized by a gap profile and is identified by matching said gap profile to a respective DP scheme. The gap profile may be specified as a combination of the DP scheme and condition characterizing one or more predefined DP violations.

In accordance with further aspects of the present invention at least part of DP resources and relationship thereof characterized by the DP scheme may be grouped in one or more groups in accordance with certain rules, wherein conditions specified in the gap profile are configured to be applied to said groups and/or combination thereof.

In accordance with further aspects of the present invention the processing further comprises running at least one rule for identifying one or more DP gaps, said rule being characterized by a scope of the rule, a condition and an action to be drawn from the rule when the condition is satisfied.

Among advantages of certain aspects of the present invention is enabling tools for monitoring the health and Service Level (SLA) of implemented business continuity and disaster recovering solutions (e.g. goals governing required recovery time, desired maximum amount of information that may be lost, performance requirements, etc.); enabling tools for planning, diagnostics, cost analysis, what-if analysis and regulation compliance verification. The present invention may facilitate automated mapping of DP resources and dependencies between such resources in a manner supporting a technology in use; tracking changes in the DP deployment; automated analyzing the DP environment to detect DP implementation gaps, bad practices and SLA breaches; automated problem resolution; automated fail-over and fail-back procedures.

In certain embodiments of the present invention the violation identified by the automated analyses may be followed by root cause analyses and respective recommendations. For example the automated analysis may verify that:
 there are no DP resources, such as, for example, storage volumes, which fail to be protected (for example, replicated and mapped to a designated target host);
 volumes are protected in a time-synchronized way;
 no data is accidentally copied to the wrong place;
 no process at the recovery site is tampering with the copies;
 versions of the OS and database software at source and target hosts are identical;
 hardware is compatible between related systems;
 underlying mechanisms are functioning properly;
 replication is performed at a frequency and with enough historical data retention so as to satisfy corporate SLAs; and other aspects related to data protection and data availability.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EXEMPLARY EMBODIMENTS

Figure 1:
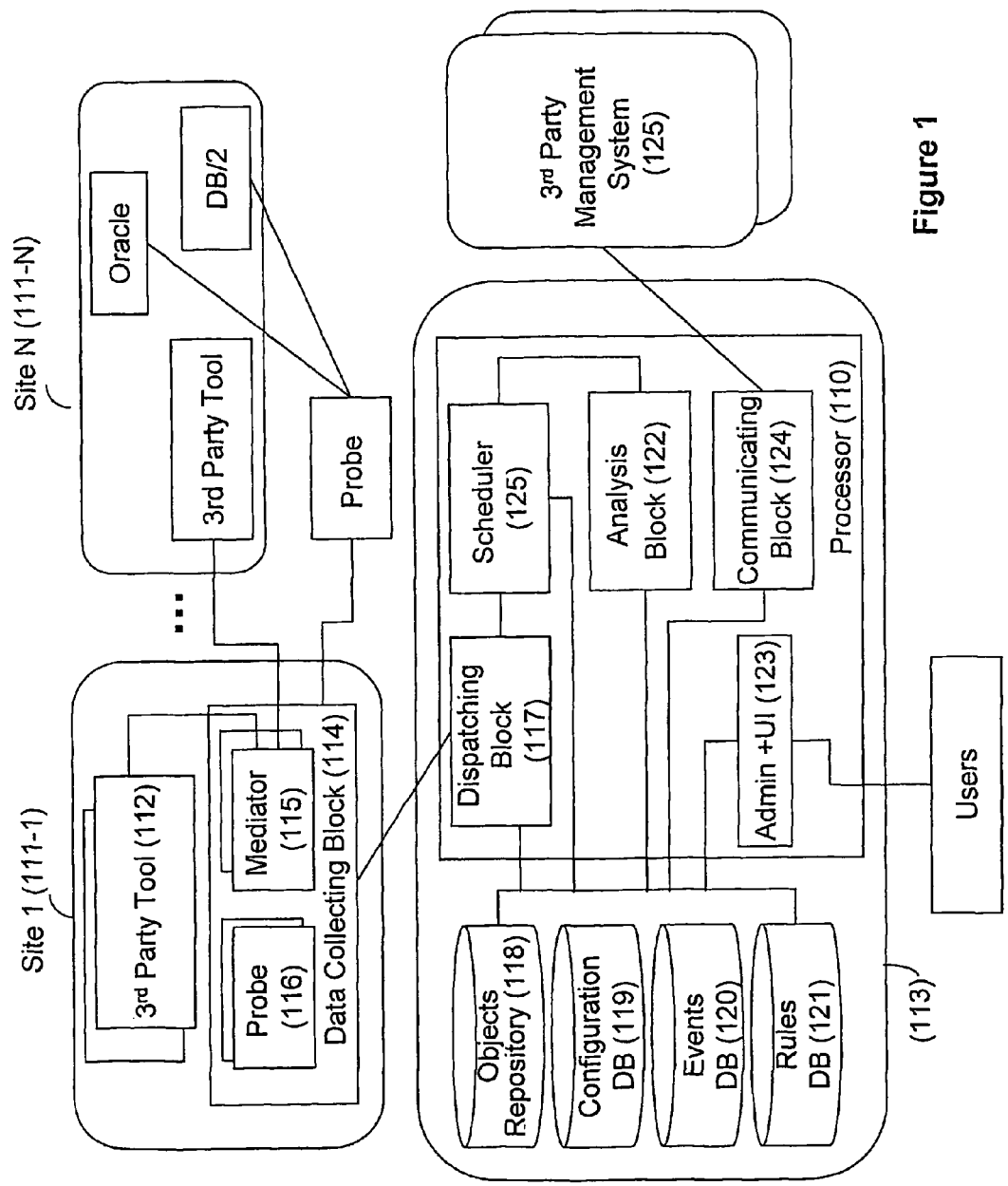
FIG. 1 illustrates a generalized high-level block diagram of a system for managing BC resources in accordance with certain embodiments of the present invention.

In the following detailed description, numerous specific details are set forth in order to provide a thorough understanding of the invention. However, it will be understood by those skilled in the art, that the present invention may be practiced without these specific details. In other instances, well-known methods, procedures, components and circuits have not been described in detail so as not to obscure the present invention. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or processor or similar electronic computing device, that manipulate and/or transform data represented as physical, such as electronic, quantities within the computing system's registers and/or memories into other data, similarly represented as physical quantities within the computing system's memories, registers or other such information storage, transmission or display devices.

The processes/devices presented herein are not inherently related to any particular electronic component or other apparatus, unless specifically stated otherwise. Various general purpose components may be used in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

The term "condition" used in this patent specification should be expansively construed to include any compound conditions, including, for example, several conditions and/or their logical combinations.

The term "criterion" used in this patent specification should be expansively construed to include any compound criterion, including, for example, several criteria and/or their logical combinations.

The term "data protection (DP) scheme" used in this patent specification should be expansively construed to include any combination of DP resources, characteristics and relationships thereof implemented in accordance with any data protection technique and/or combination thereof. The data protection techniques include data replication techniques based on one or more of tape and/or disk backup; block level, file level and/or point in time replications; archive logs, clustering, load balancing and/or any other data protection standard, system and/or protocol and variants or evolution thereof.

The term "data protection (DP) gap" used in this patent specification should be expansively construed to include differences between the implemented DP scheme and desired state thereof (e.g. in accordance with best practice, benchmarking, knowledge database, or other desired state formulated in explicit or implicit manner.). The DP gap may be characterized by severity, impact on data protection and/or otherwise. Non-limiting examples of DP gaps include data inconsistency between source and target systems; incomplete data between source and target systems; inappropriate software and/or hardware configuration between source and target systems; SLA breaches; data accessibility and/or data path problems; data tampering; general best practice violations; wasting of DP resources, etc.

The term "data protection (DP) resource" used in this patent specification should be expansively construed to include any physical objects, logical objects and combination thereof involved in data protection. The physical objects include objects of computing, storage and network infrastructure as, for example, servers, storage devices, disks, switches, etc. and parts thereof. The logical objects include databases, applications, replications, back-ups, archive logs, visualization schemes, configurations, policies (e.g., backup schedule, data replication scheme, high-availability configuration) or other logical entities, including metadata.

The references cited in the background teach many principles of data protection implementation and managing that are applicable to the present invention. Therefore the full contents of these publications are incorporated by reference herein where appropriate for appropriate teachings of additional or alternative details, features and/or technical background.

Bearing the above in mind, attention is drawn to FIG. 1 schematically illustrating a generalized high-level block diagram of a system for managing DP resources. In accordance with certain embodiments of the present invention, the DP system is configured to enable automated identifying implemented data protection scheme or parts thereof, and/or to enable automated identifying one or more data protection gaps. Non-limiting examples of DP gaps include:

data inconsistency between source and target systems, such as standby cluster nodes, a host and its backup server, source application A and a target application B which needs to access a data copy of application A (caused, for example, if two distinct data items in use by the source system are replicated to the target system to reflect different point-in-time copies, or being replicated while being modified, without appropriate coherency mechanisms applied, etc.);

incomplete data between source and target systems (e.g. missing data item at the target system, used by the source system but not replicated, although required for its operation, etc.);

inappropriate hardware configuration between source and target systems (e.g. standby cluster nodes having hardware not powerful enough to perform the primary node tasks; target system with replicated operation system having hardware devices different than the source system and not functioning due to lack of appropriate device driver software, etc.);

inappropriate software configuration between source and target systems (e.g. on the source and target systems may be installed different versions of the operating system or applications, thus preventing the target system to take over the function of the source system);

SLA breaches (e.g. not guaranteed maximal time difference between source and target data, certain amount of data copies, maximal time for return to operation, etc.);

data accessibility and/or data path problems (e.g. wrong mapping of data or applications, zoning or masking problems in Storage Area Network (SAN) environment preventing standby or backup server data access, etc.);

data tampering (e.g. inappropriate modification of data copies performed by a system other than that for which the data is intended);

General best practice violations;

Wasting of DP resources;

Extended recovery time;

Wrong sequence of maintenance activities.

The DP resources of an enterprise or other organization may be grouped in one or more sites (111-1, 111-N) having different or same geographical location. One or more sites may comprise $3^{rd}$ party tools (112) capable of collecting information related to data protection scheme, including respective DP resources.

The system for managing DP resources (referring hereinafter as DP system) may be fully co-located at one of the sites, distributed between the sites or fully or partly located at a separate site (113) as illustrated in FIG. 1. The DC system comprises one or more data collecting blocks (114) operatively coupled to a dispatching block (117) in a processor (110). The data collecting blocks are configured to receive information requests from the dispatching block, correspondingly collect from the sites information related to respective DC resources, and to send the information to the dispatching block. The data collecting blocks may be located at each site or information from at least part of the sites (e.g. illustrated site 111-N) may be collected remotely. The data collecting block comprises one or more mediators (115) and/or one or more data collecting probes (116). The data collecting block is configured to request and obtain information from the $3^{rd}$ party tools (112) with the help of one or more mediators (115) and/or directly from the objects with the help of one or more probes (116). The connection with 3rd party tools and/or DC resources may be provided via standard protocols such as WMI, SNMP, SMI-S, SSH, Telnet, remote scripting, etc., as well as via software agents installed at $3^{rd}$ party tools and configured to query the tools and to send the respective response.

The mediator is configured to communicate with one or more $3^{rd}$ party tools capable to provide information related to DP resources. The mediator comprises one or more interfaces configured to modify the requests received from the dispatching block in accordance with properties and/or capabilities of certain $3^{rd}$ party tool(s) (e.g. ECC, HiCommand, Tivoli, and other network management and/or storage resource management tools), and to enable sending the modified information requests accordingly. The mediator is also configured to transform the information obtained from certain 3rd party tool(s) into a data structure recognizable by the DP system. The probe is configured to communicate with one or more DP resources at one or more sites, to obtain the information related to said resources and, if necessary, to transform said information into a data structure recognizable by the DP system.

In certain embodiments of the invention the DP system may be configured to obtain data directly from $3^{rd}$ party tool(s) with no need in data collecting block or parts thereof (e.g. in a case of standardization the structure of the information request and the obtained data, in a case of integration with $3^{rd}$ party tools, etc.).

The data collecting block may support different methods of collecting the information, e.g. discovery and scanning. Discovery is the process of collecting general information on the topology of the system, which can be passive, meaning that the discovered system in not aware that it is being monitored or active, which may interfere or overload the system. Scanning is the process of gathering specific information on a known object (server, application, hardware, etc.); typically the information is collected in an active form.

The dispatching block (117) is configured to interact with the data collecting block(s) (114) by sending information requests and obtaining collected data. The obtained information and/or derivatives thereof are further accommodated in one or more data repositories operatively coupled to the dispatching block. The data repositories include object repository database (118) containing information related to DP resources (e.g. hosts, applications, servers, and other physical and logical objects) and properties thereof. This DB also contains relationships between resources and respective DP schemes. The relationship information may be obtained via the data collecting block and/or generated by the system as will be further detailed with reference to FIG. 2.

The object repository DB is automatically updated in a manner enabling reflecting additions, removal or modification of resources and relationships thereof. The criterion for updating the object repository DB may be related to obtaining information via data collecting blocks, importing information (e.g. configuration, etc.) from other data repositories and/or $3^{rd}$ party DB, generating information by the DP system, entering information by a user, etc. The object repository DB may also comprise history data related to additions and/or deletions of DP resources and/or changes of properties and/or relationships thereof.

The data repositories also include system configuration database (119) containing information related to the DP system configuration, e.g. installed probes, mediators and interfaces thereof, etc. The system configuration also includes configuration of dataset to be obtained for DP resources (e.g. type of resource, characteristics and/or properties to be received, etc.) and/or data collection rules (e.g. which objects need to be scanned and which objects may be excluded from further processing, etc.).

The dispatching block sends the information requests in accordance with time schedule and/or triggering event(s) (including user's request). The time schedule and/or triggering events may be preconfigured and/or configured during operating the DP system (by a user or automatically in accordance with certain rules). The dispatching block processes the obtained information and provides its preliminary analyses. The dispatching block is also configured to scan the object repository DB for detecting new resources and/or existing resources requiring further information. The results of the preliminary analysis and/or scanning the object repository DB (e.g. detected new resource, detected need in additional information, etc.) may serve as triggering events for sending information request to the data collecting block. The requests may be, for example, for information discovery (e.g. retrieving information from certain $3^{rd}$ party tool) and/or for scanning (e.g. to scan certain resource for specific properties). The request comprises information related to resources to be discovered/scanned, properties to be retrieved, etc. Based on information comprised in the configuration DB and the object repository DB, the dispatching block is capable to decide if the results of analysis/scanning shall trigger a new request and/or to decide about a content of said request (e.g. by comparing information accommodated in the object repository DB with requirements for information to be obtained, said requirements and rules for decisions accommodated in the configuration DB).

Collecting data about certain physical resources may result in discovering a new physical resource to be added to the object repository DB and further scanned for obtaining its characteristics and relationship thereof. For example, scanning a storage device typically yields some information regarding the host(s) connected to that device, said host(s) may be missing in the object repository DB. In certain cases obtained data may be insufficient for adding the discovered resource to the DB. Such resources may be provided with special handling, including requesting human assistance.

Collecting data about physical DP resources may also identify new logical resources related to the physical resources. Said logical resources and relations thereof are added to the object repository DB and further scanned for obtaining information in accordance with requirements accommodated in the configuration DB. The process may be recursive, for example, data collecting about a host may discover a database related to the host; data collecting about the database may discover additional logical resources such as, for example, table-spaces, tables and data files, etc.

The dispatching block may be configured to consolidate the data obtained from data collecting blocks into one or more queues for further processing before entering into the object repository DB. The processing may include the following operations:

filtering data and removing surplus or other unnecessary data;
    validating the correctness of the data (structure wise);
    solving conflicts in data coming from different sources, etc.

Data validation and/or solving conflicts may be provided in accordance with a predefined set of priorities and/or other guidelines and logic associated with certain probe, mediator, resource, data type, etc. For example, a conflict may be resolved by assigning to certain probe a priority higher than assigned to another probe, etc.

The data repositories further include event history database (120) comprising information related to DP gaps discovered during the DP system operating; and rules database (121) further detailed with reference to FIG. 2.

The data repositories (118-121) are operatively coupled to the processor (110). The processor comprises the dispatcher block (117), an analysis block (122) further detailed with reference to FIGS. 3-4, a user interface block (123), a communicating block (124), and a scheduler (125).

The user interface block (123) is configured to enable one or more users to communicate (e.g. as web clients) with the DP system (e.g. for topology browsing as further detailed with reference to FIG. 5, monitoring DP resources, etc.). The user interface block is also configured to provide administrative functions necessary for operating the DP systems, for example, authorization and access control, licensing, user/role management, etc. The user interface may enable, for example DP system configuring, reporting and other administrative functions.

The communicating block (124) is configured to enable communication with various network monitoring systems, storage resource management systems, enterprise consoles, customer portals, IT asset repositories and other management systems installed in the user's environment (e.g. Tivoli, HP OpenView, Topaz, etc). The block is configured to notify these systems on events related to DP resources and to enable said system to access the DP system through specific APIs.

The scheduler (125) is further operatively coupled to the analysis block and dispatching block. The scheduler comprises an execution configuration of the DP system (e.g. time schedules and/or rules for execution operations by the functional blocks), and is configured to communicate with the functional blocks for providing information and/or commands related to execution configuration.

Those skilled in the art will readily appreciate that the invention is not bound by the configuration of FIG. 1; equivalent functionality may be consolidated or divided in another manner. In different embodiments of the invention the blocks and/or parts thereof may be placed in multiple geographical locations; operative connections between the blocks and within the blocks may be implemented directly or indirectly, including remote connection. The connection may be provided via Wire-line, Wireless, cable, Internet, Intranet, power, satellite or other networks and/or using any communication standard, system and/or protocol and variants or evolution thereof. The functions of the blocks may be implemented in (or integrated with) different physical equipment. The invention may be implemented as an integrated or partly integrated part within $3^{rd}$ party equipment as well as in a stand-alone form.

Those skilled in the art will also readily appreciate that the data repositories may be consolidated or divided in other mauler; some of these databases may be shared with other systems, including $3^{rd}$ parties systems.

Figure 2:
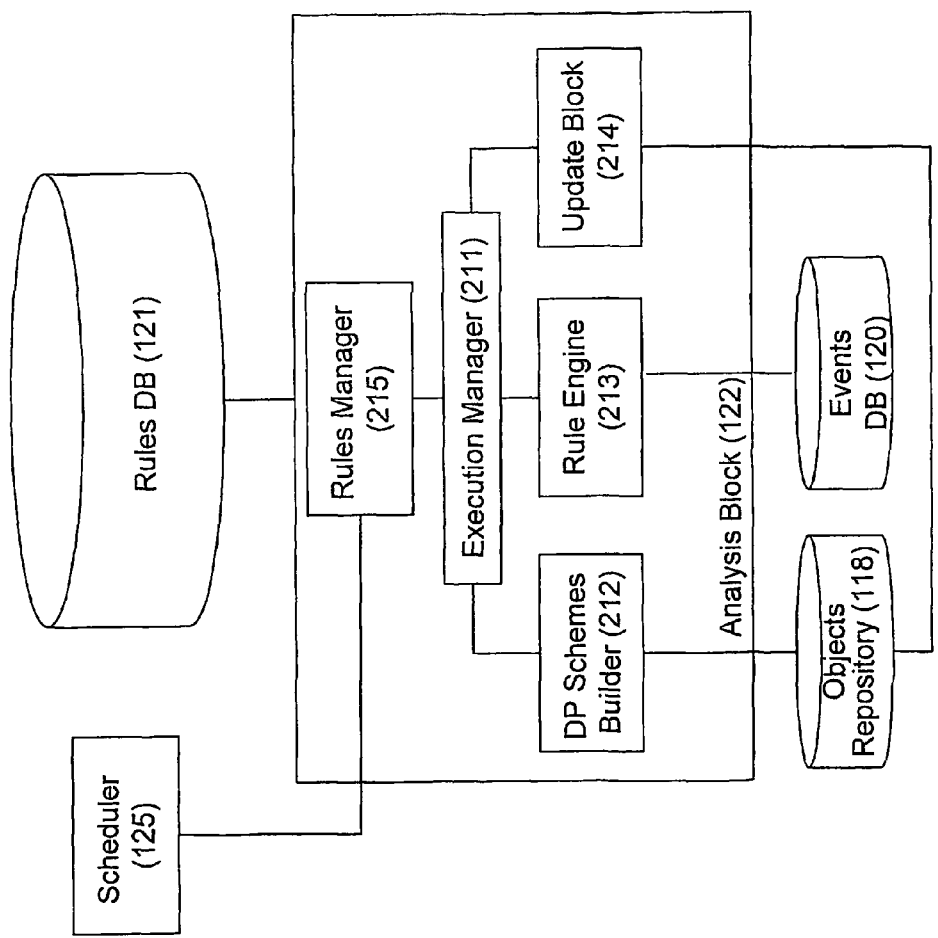
FIG. 2 illustrates a generalized block diagram of an analysis block in accordance with certain embodiments of the present invention.

Referring to FIG. 2, there is illustrated a generalized block diagram of the analysis block in accordance with certain embodiments of the present invention. The analysis block (122) is configured to identify implemented DP schemes and/or DP implementation gaps related to said schemes. The analysis is provided in accordance with rule specifications accommodated in the rules database (121). The rules may be related to relationship analysis, identifying new DP resources, characteristics and relationship thereof, DP scheme identification and generation, object repository update. DP gap analysis and/or combination thereof, etc. The rule specification comprises a rule scope, a condition including rules logic and criterion to be satisfied; and an action which shall be drawn from the rule when the condition is satisfied. The rule scope defines a range of DP resources or DP schemes where respective rule is applicable. The action to be drawn may include any compound actions, including, for example, several actions and/or registered conclusion and/or their logical combinations.

The rules accommodated in the rules DB (121) may be updated by the user, and/or updated through an automated update mechanism, e.g. rules learned at one user may be modeled and distributed to other users similar to the update of anti-virus signatures.

The analysis block comprises an execution manager (211) operatively coupled to a DP schemes builder (212), a rule engine (213) and a rule manager (215).

The rule manager (215) is further operatively coupled to the scheduler (125) and is configured to receive from the scheduler commands related to one or more rules to be executed. The rule manager is also operatively coupled to the rules DB (121) and is configured to obtain from the rules DB one or more rule specifications to be executed and to transfer said specification to the execution manager. In certain embodiments of the invention the rule manager may be also operatively coupled to the user interface and configured to enable rule configuration-related actions to be provided via user interface as, for example, adding new rules, removing or changing existing ones, configure which rules to execute and when, etc.

The execution manager is configured to receive from the rule manager specification(s) of one or more rules to be executed, and to transfer said specification(s) to the DP schemes builder (212). The DP schemes builder is configured to receive the rule specification, to extract a list of DP resources specified in the rule, to generate a request to the object repository DB (118) for information accommodated thereof and related to one or more resources specified in the rule, to generate, based on the received information, respective DP scheme(s) and to transfer said DP scheme to the execution manager. Obtaining and/or generation of the DP scheme can be performed in various ways (e.g. as the result of a SQL query for information comprised in the objects DB, as a multi-step process comprising identifying relationship between DP resources, etc.). The generated DP schemes may be generated for operational purposes only or further stored in the objects DB.

The execution manager is further configured to receive the generated DP scheme and to transfer it together with rule specification to the rule engine (213) configured to run the rule in accordance with received specification and DP scheme. The rule engine is further configured to update corresponding data repositories, e.g. to update the events history DB (120) if the rule's execution is resulted in finding a gap, and to update the objects repository DB (118) if the rule's execution is resulted in setting a relationship (or changing or removing an existing relationship) between the DP resources.

For example, relationship rules may result in adding one or more dependencies between two or more DP resources (objects); the non-limiting examples of dependences are illustrated in Table 1.

In the examples illustrated in Table 1 the relationship rule is applied to Object 1 and Object 2 (in accordance with rule specification); upon matching respective condition the DP resources are considered to be related with a nature of dependency corresponding to the condition. Said conclusion following by updating the object repository DB is the action specified in the rule to be drawn when the condition is satisfied.

More complex relationship rules may be used to deduce additional dependencies from already discovered dependencies. For example:

if an application uses a file (dependency 8), and the file is contained in a volume (dependency 9), then the application uses the volume;

if host A uses a volume (dependency 1), and that volume has a remote copy (dependency 6), and the volume which is a remote copy is used by another host B, then host B is "using replicated information" of host A;

if it is detected that certain application (such as Oracle) is installed on host A and uses volume 1 (as described above), and similar application is installed on host B

TABLE 1

| | Object 1 | Object 2 | Condition: nature of dependency | Notes |
|---|---|---|---|---|
| 1. | Storage volume | A host | The host "uses" the volume | One host may use more than one volume (frequent phenomenon), and one volume may be used by more than one host (infrequent phenomenon, can be found in cluster environments) |
| 2. | Storage volume | A storage device | The storage device "contains" the volume | |
| 3. | Storage device | Another storage device | The two storage devices are connected to the same fabric | |
| 4. | Storage device | Another storage device | One of the storage devices is configured with software or hardware replication to the other storage device | |
| 5. | Storage volume | Another storage volume | One of the volumes is a local copy of the other | Subtypes of copies can exist (for example, "BCV" copy, "Snapshot" copy) |
| 6. | Storage volume | Another storage volume | One of the volumes is a remote copy of the other | By "remote" it means that the two volumes are not contained on the same storage device |
| 7. | Host | Application | The application is installed on the host | One host may have more than one application installed and one application may be installed on more than one host |
| 8. | Application | File | The application uses the file | |
| 9. | File | Volume | The file is contained in the volume | |
| 10. | Volume | Volume group | The volume is contained in the volume group | |
| 11. | Application | Domain entry | The application uses the domain entry | Domain entries can be, for example, host names, user profiles, etc. |
| 12. | Application | Registry entry | The application uses the registry entry | | using the replica of volume 1, then it can be calculated that "host B is a candidate application standby of host A"

Following is an example of a gap analysis rule:

<Scope of the rule: DP scheme>:
  Oracle databases, from version 9i and above, which have an instance protected by using EMC SRDF, in asynchronous mode, wherein the DP resources comprised in the DP scheme are characterized by the following:
  Version of Oracle software;
  List of data files used by the Oracle machine;
  List of storage volumes used by the Oracle machine;
  Mapping of data files used to volumes used;
  Dependencies, if exist, between any two volumes used;
  List of replicas existing for the used volumes;
  Dependencies, if exist, between any two replicas
<Condition Logic>
  For each Oracle instance;
  If more then one data file exists, AND;
  If more than one volume is used containing data files, THEN;
  For each replica of the used volumes, calculate replication SLA (replica time, volume group, status, target storage device), AND;
  Unless all calculated replication SLAs are identical, THEN;
  ACTION
<Action>
  Identify the gap and update the event DB accordingly.

In certain embodiments of the invention the instructions comprised in the rule specification may be written using a rule language. The rule language includes at least the following categories:

"Find the object" as, for example, single object, pairs of objects, group of objects, object representing connection between other objects (e.g. the replication connection between two Oracles is considered as an object);

"Comparing and validating the objects" as, for example, to validate that the object has certain characteristic and/or value thereof, comparing two objects' characteristics and/or values thereof. The comparison may be provided straightforward (e.g. verifying that the value is the same), using a comparison function that may compare the values according to certain logic, etc.

"Updating the object repository DB" with additional properties or objects, this is used mainly to add dependency connection between two objects.

Non-limiting examples of rule language functions are illustrated in Table 2.

TABLE 2

| Category | Parameters | Output |
| --- | --- | --- |
| FindObject | Matching criteria [, Matching criteria] | List of Objects that match the criteria |
| FindObject/ FindMatches | Matching criteria [, Matching criteria] | List of Pairs (or more) of objects that match the criteria |
| Compare | Object, Object, Property Name, Comparison Function [, Property Name, Comparison Function] | Compare properties of two objects according to a comparison function |
| Validate | Object, Property Name, Expected Value [, Property Name, Expected Value] | Validate the actual values of the object's properties against the expected values |
| AddConnection | Object, Object, Connection Type [, Property Name, Property Value] | Add a connection between two objects, properties may be added to the connection object that will be created |

TABLE 2-continued

| Category | Parameters | Output |
| --- | --- | --- |
| | Value] | to the connection object that will be created |

Other language categories (e.g. AddObject, UpdateObject, DeleteObject, UpdateConnection, DeleteConnection, etc.) and respective rule language functions may be constructed in a similar manner.

The following non-limiting examples illustrate the language application. The gap analysis rules will be further detailed with reference to FIG. 4.

1) Example of relationship rule: Create a dependency between two Oracle applications that have a replication connection, the replication connection is deduced from one Oracle that uses a SAN storage that is replicated to a different SAN storage which is used by the other Oracle application:

```
Matches = FindMatches("MATCH bject type:Oracle",
       "object type:Connection, connection
    type:Uses",
          "object type:SAN",
          "object type:Connection, connection
    type:Replication",
          "object type:SAN",
          "object type:Connection, connection
    type:UsedBy",
             "MATCH object type:Oracle")
       AddConnection(Matches, "Replication")
```

2) Example of gap analysis rule #1: Verify that all replicated Oracles have the same HW configuration:

```
Matches = FindMatches("MATCH object type:Oracle",
       "object type:Connection, connection
    type:Replication"
          "MATCH object type:Oracle")
       Compare(Matches, "CPU", "CPU Compare",
          "OS", ""
          "Memory", "Memory Compare")
```

3) Example of gap analysis rule #2: Verify that the SLA for Oracle replication is less than 2 hours:

```
Object = FindObject("object type:Oracle",
       "object type:Connection, connection
    type:Uses",
          "object type:SAN",
          "MATCH object type:Connection, connection
    type:Replication",
          "object type:SAN",
          "object type:Connection, connection
    type:UsedBy",
             "object type:Oracle")
       Validate(Object, "Schedule", "<2 Hours")
```

The scope of the rules may be characterized by different combinations of DP resources, their properties and relationships thereof as, including, for example:

a combination of recent and past information about the DP resources and their properties including multiple values from different points in time related to the same DP resource and/or property;

a combination of recent and past information about relationships and properties of certain DP resource including multiple values from different points in time related to the same relationship and/or property;

a combination of historical information about DP resources with information comprised in the event history DB, including events representing identified gaps; etc.

The following example illustrates a rule with a scope comprising at least one previously registered gap.

If a primary host and a standby host are both mounting network file systems; AND;

If each host (primary or standby) uses a different fileserver; AND;

If the file server sharing the network file system that the primary server mounts is storing the data on a storage resource, and that storage resource is replicated to a second file server; AND;

If the said second file server is exporting the replicated data; AND;

If the standby host is mounting a network file system stored on said replicated data resources on the said second file server;

THEN

If there exists one or more recent gap events in the event history DB related to either the fileservers and the said storage resources; OR to the replication of the said resources

THEN

Create a new gap event relating to the primary and standby host, specifying that the standby is accessing a replica of the data used by the primary, while the replica has a DP risk.

The above example illustrates a gap rule for identifying risk of deployment inconsistencies in the access of network file systems by primary and standby host pairs.

Those skilled in the art will readily appreciate that the invention is not bound by the configuration of FIG. 2; equivalent functionality may be consolidated or divided in another manner.

Figure 3:
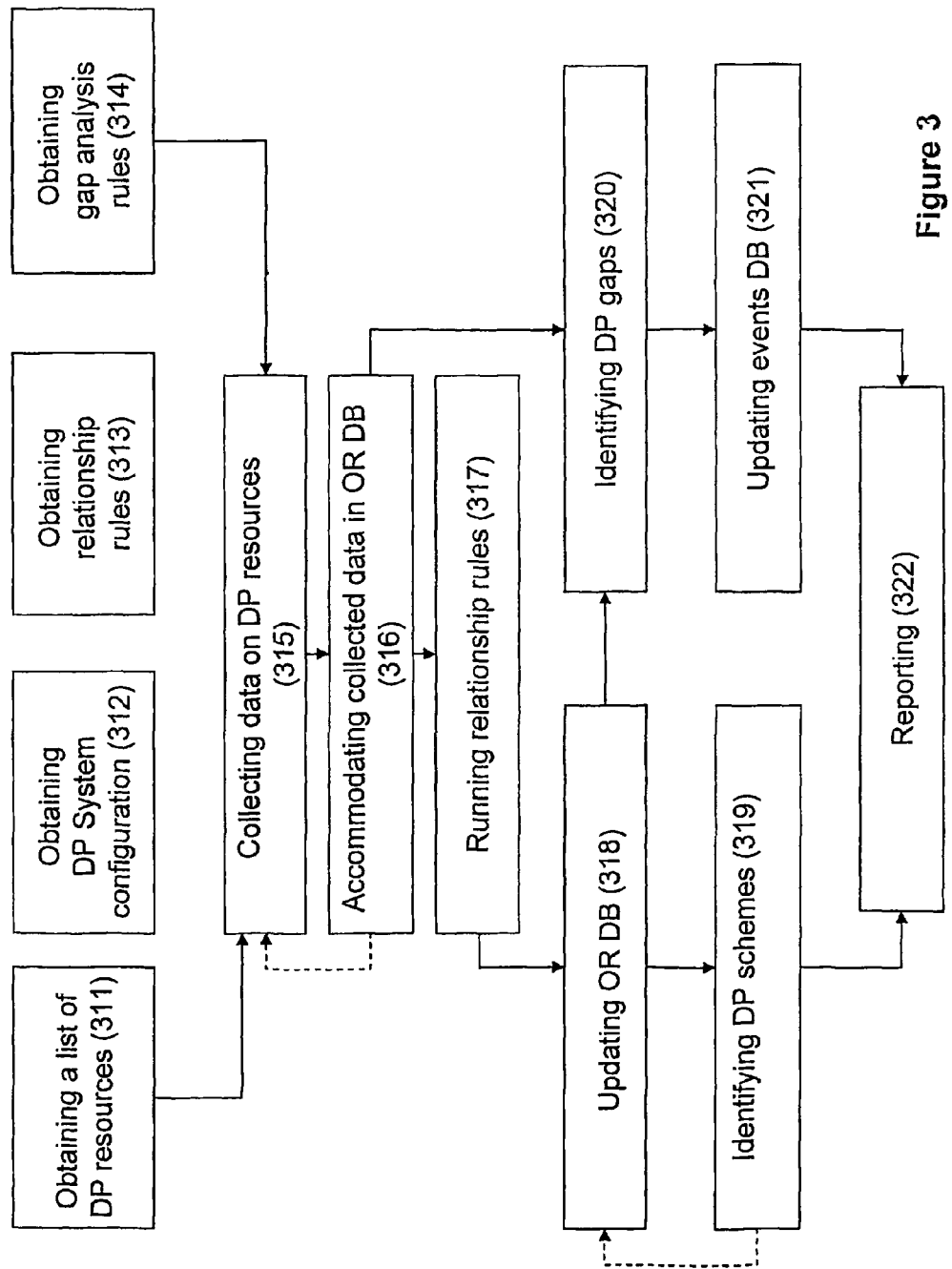
FIG. 3 illustrates a generalized flow diagram of managing DP resources in accordance with certain embodiments of the present invention.

Attention is drawn to FIG. 3 illustrating a generalized flow diagram of the operations in DP management system in accordance with certain embodiments of the present invention.

As illustrated in FIG. 3, the system operation starts with obtaining a list of DP resources (311), obtaining configuration of DP system (312), obtaining specification of relationship rules (313) and obtaining specification of gap analysis rules (314). The information may be obtained entirely or partly by manual input, imported from existing documentation, collected from external sources (installed at the user site as, for example, network management or storage resource management systems; and/or remote sources as, for example, knowledge database), from the DP resources or otherwise obtained. The obtained information related to list of DP resources is accommodated in the object repository DB (118). The obtained DP system configuration (e.g. installed probes, mediators and interfaces thereof, configuration of dataset to be obtained for different DP resources, data collection rules, data collection and rules execution schedules and preconfigured triggering event, etc.) is accommodated in the configuration DB (119). The obtained rules specifications are accommodated in the rules DB (121).

When prepared for operation, the DP system starts to collect data (315) of DP resources as was detailed with reference to FIG. 1. The collected data are accommodated (316) in the object repository DB, the DP system runs relationship rules (317) as was detailed with reference to FIG. 2 and updates (318) the object repository DB in accordance with results of the rules execution. Certain data, when accommodated, may trigger a new round of data collecting in accordance with configured triggering events.

As will be further detailed with reference to FIGS. 4-5, the DP systems analyzes the data accommodated in the object repository DB for identifying DP schemes (319) to be used for identifying DP gaps (320) and/or updating the object repository DB. The DP gaps are identified by running gap analysis rules. Some of the gap analysis rules may be implemented regardless identifying the DP schemes (e.g. as was detailed with reference to FIG. 2), wherein the scope of another rules is characterized by certain DP schemes as will be further detailed with reference to FIGS. 4-5. The identified gaps are accommodated (321) in the events DB. The DP gaps accommodated in the events DB may be sorted in accordance with their severity (e.g. critical, high risks, moderate risk, low risk, info), in accordance with their impact (e.g. leading to complete data lost, significant risk to data, prolonged downtime, service disruption, improvement opportunity, waste of resources) or otherwise.

The rules may be scheduled to run at a desired frequency (e.g. from several times a week to several times a day, according to the configuration chosen by the user), and/or triggered by certain events (e.g. a notification from an external SRM system that a new volume has been created, notification by an NMS system that a new server has been detected, new obtained dependency between DP resources, user's request, etc.).

The rules' execution may be governed by certain considerations regulating execution scope and/or sequence. For example, the user may customize conditions of one or more rules for a certain scope (e.g. for certain server(s) ignore performance differences less than 50% between source and target servers);

determine a precedence for rules with overlapping scopes;

determine the execution sequence in accordance with certain parameters, e.g. the scope of the rule (e.g. a rule detecting missing volumes at the application level will be run before a rule detecting missing volumes at the host level), etc.

The system may further generate (322) reports (e.g. alerts, tickets, logs, etc.) to be provided to the user and/or $3^{rd}$ party systems. As will be further detailed with reference to FIG. 6, the system may also provide visual representation of the data accommodated in the object repository DB and the events DB.

The reported gap may be characterized by the following attributes:

category of the gap (e.g. data inconsistency, incomplete data, inappropriate hardware or software configuration, SLA breaches, data accessibility and/or data pass problems, etc.), the gap may be assigned more than one category;

the applicable DP scheme and/or respective DP resources; in certain embodiments of the invention each DP resource comprised in the DP scheme is associated with a unique identifier indicating the relation of this resource to the gap (e.g. for the gap characterized by software incomparability between active and standby servers each resource shall be identified as an active or a standby);

the time of gap detection;

the time the gap was dismissed;

the severity of the gap;

ability to acknowledge the gap (mark as "not a gap") and others.

Figure 4:
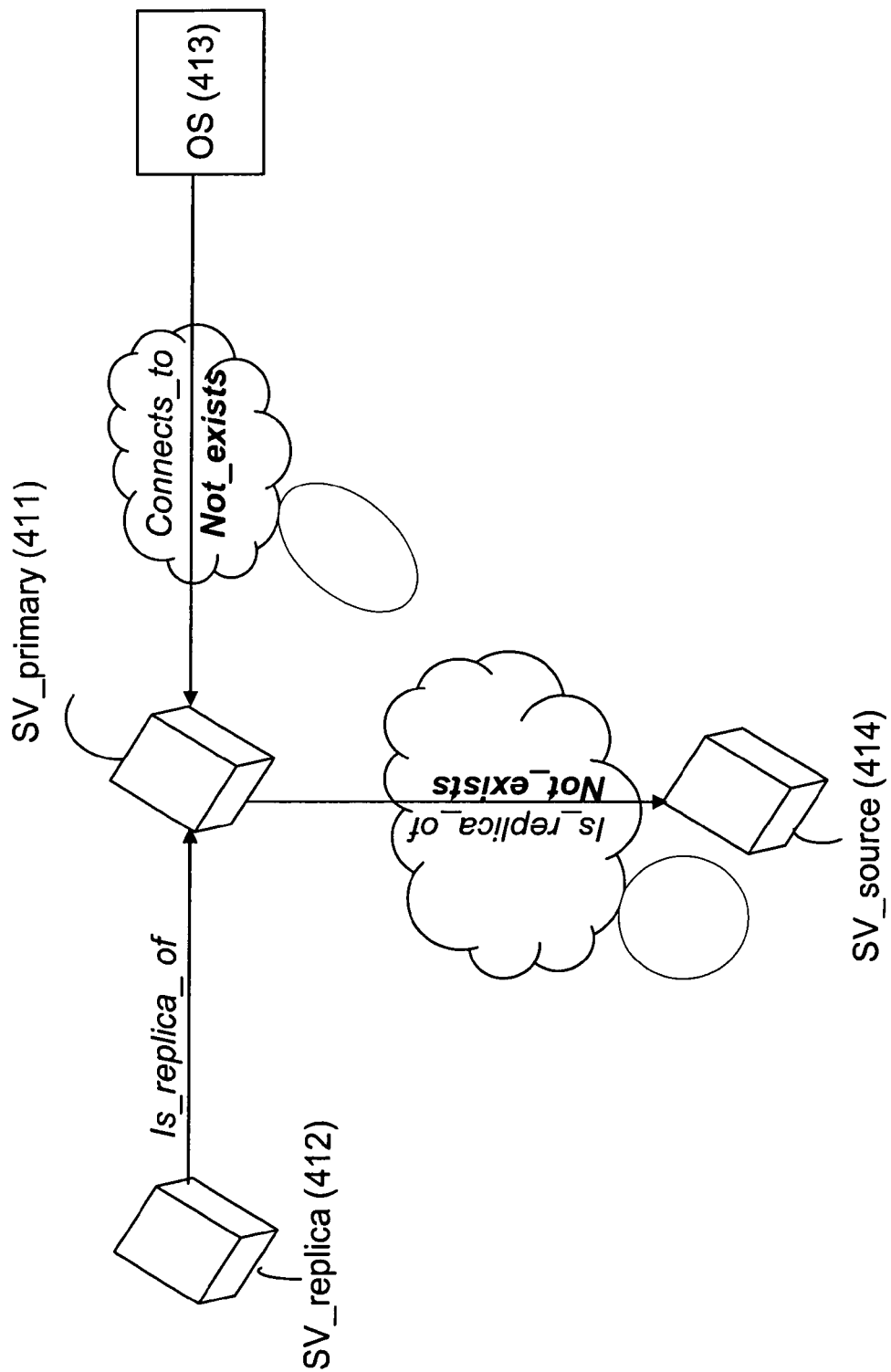
FIG. 4 illustrates an exemplified DP scheme matching a certain gap profile in accordance with certain embodiments of the present invention.

Attention is drawn to FIG. 4 illustrating non-limiting example of generalized DP scheme matching a gap profile of "wasted resources".

In accordance with certain embodiments of the present invention the DP gaps may be formalized and characterized by certain profiles. The gap profile is descriptive of a pattern which constitutes a known DP violation (e.g. in accordance with best practice, benchmarking, knowledge database, previous gap-related analysis, etc.). Accordingly, the gap analysis rule may specify the gap profile as a combination of scope and condition (e.g. DP scheme in combination with one or more predefined violations and logic of their analysis) and/or derivatives thereof to be inspected in order to identify certain gap(s). Accordingly, the identifying is provided by matching one or more specified gap profiles to a respective DP scheme.

The gap profiles may be accommodated and maintained as part of the gap analysis rules and/or in a dedicated database. In certain embodiments of the invention the DP system is configured to enable:
creation of a new gap profile;
updating an existing gap profile;
marking a gap profile as obsolete/terminated;
In the non-limiting examples illustrated with reference to FIGS. 4-5, the gap profile comprises combination of DP scheme and DP gap-related conditions (e.g. predefined violations and logic of their analysis).

The DP scheme illustrated in FIG. 4 comprises DP resources such as primary storage volume (411), its replica (412), operating system (413) and storage volume (SV) (414), characterized by the following relationship:

SV (411) is not itself a copy of any other SV; (a fact apparent from the condition "not_exists" between itself and SV (414), which means that no SV exists, of which SV (411) is a replica);

Similarly, SV (411) is not connected to any OS (likewise, concluded from the "not_exists" condition it has with OS (413), which means that there does not exist an OS which connects to SV (411));

SV (411) has a copy SV (412).

DP gap-related condition specifies that if a DP scheme comprising above DP resources does not comprise a relationship enabling OS access to the primary SV, the gap is considered as "wasted resources at primary SV".

Accordingly, running the respective rule resulting in identifying a DP scheme matching the above profile means that a gap with the respective profile is identified.

The following is a non-limiting example of representing the above gap profile in XML-based language:

```
<?xml version="1.0" encoding="UTF-8" ?>
    <pattern-definition id="Primary SV not connected to OS">
    description: This pattern represents a scope for matching primary
SVs with replicas, which are not used by any OS>
    </description>
    <select>
        <item id="SV_Primary">SV</item>
        <item id="SV_Replica">SV</item>
        <item id="StorageArray_Primary">StorageArray</item>
        <connection id="SV_Replica__SV_Primary"
        from="SV_Replica"
        to="SV_Primary">IsReplicaOf</connection>
        <connection id="StorageArray_Primary__SV_Primary"
        from="StorageArray_Primary"
        to="SV_Primary">Has</connection>
    </select>
    <condition>
        <type id="SV_Primary">SV</type>
        <type id="SV_Replica">SV</type>
        <type id="StorageArray_Primary">StorageArray</type>
```

-continued

```
        <type id="StorageArray_Primary__SV_Primary">Has</type>
        <type id="SV_Replica__SV_Primary">IsReplicaOf</type>
        <not> <exists>
            <select>
                <item id="SV_Source">SV</item>
                <item id="SV_Primary">SV</item>
                    <connection id="SV_Primary__SV_Source"
                from="SV_Primary"
                to="SV_Source">IsReplicaOf</connection>
            </select>
            <condition>
                <type id="SV_Primary">SV</type>
                <type id="SV_Source">SV</type>
                    <type
                id="SV_Primary__SV_Source">IsReplicaOf</type>
            <condition>
        </exists> </not>
        <not> <exists>
            <select>
                <item id="OS">OS</item>
                <item id="SV_Primary">SV</item>
                <connection id="OS__SV_Primary" from="OS"
            to="SV_Primary">ConnectsTo</connection>
            </select>
            <condition>
                <type id="SV_Primary">SV</type>
                <type id="OS">OS</type>
                <type id="OS__SV_Primary">ConnectsTo</type>
            </condition>
        </exists> </not>
    </condition>
</pattern-definition>
```

In accordance with certain embodiments of the present invention, certain DP resources and relationship thereof comprised in the DP scheme may be grouped in accordance with certain rules, wherein conditions specified in the gap profile may be applied to said physical and/or logical groups and/or combinations thereof For example, a parent resource (e.g. host, Operating System ("OS"), OS Volume Group ("VG"), Oracle instance data files, application, etc.) may be associated with a group of data accommodating resources (e.g. storage volumes, blocks on disk(s), segments of memory, entities within directory services, files, file systems, network file systems, etc.) characterized by completeness and consistency requirements with regards to said parent resource. Such a group of data accommodating resources associated with a parent resource is referred to hereinafter as a meaningful resource group (MRG).

For example, a Unix (e.g., HP/UX, AIX) Volume Group can be chosen as a parent resource. Storage volumes (SVs) constituting the VG may be grouped in MRG associated with the parent resource; the set of an Oracle Instance data files can be handled as an MRG associated with Oracle Instance as a parent resource; ERP application may be regarded as a parent resource associated with MRG comprising a set of files, DNS entries, password entries stored in a password file, configuration files, etc.

An MRG may comprise data accommodating resources, other MRGs or any combination thereof. For example, an Oracle Instance may be associated with several MRGs comprising different combinations of Oracle Data files MRG, Oracle control files MRG, Oracle Log file MRG and an Oracle archives MRG.

Another logical ordered group may comprise a sequence of replica techniques used for each replication between a source data accommodating resource and a target data accommodating resource. Such group is referred to hereinafter as a layout path. Replication techniques include, for example, clones, Business Continuous Volumes (BCV), remote replication, snapshots, snapshot mirrors, scripts, software replication tools, manual copies, etc. Non-limiting examples of above groups are illustrated in FIG. 5a-5c.

Figure 5A:
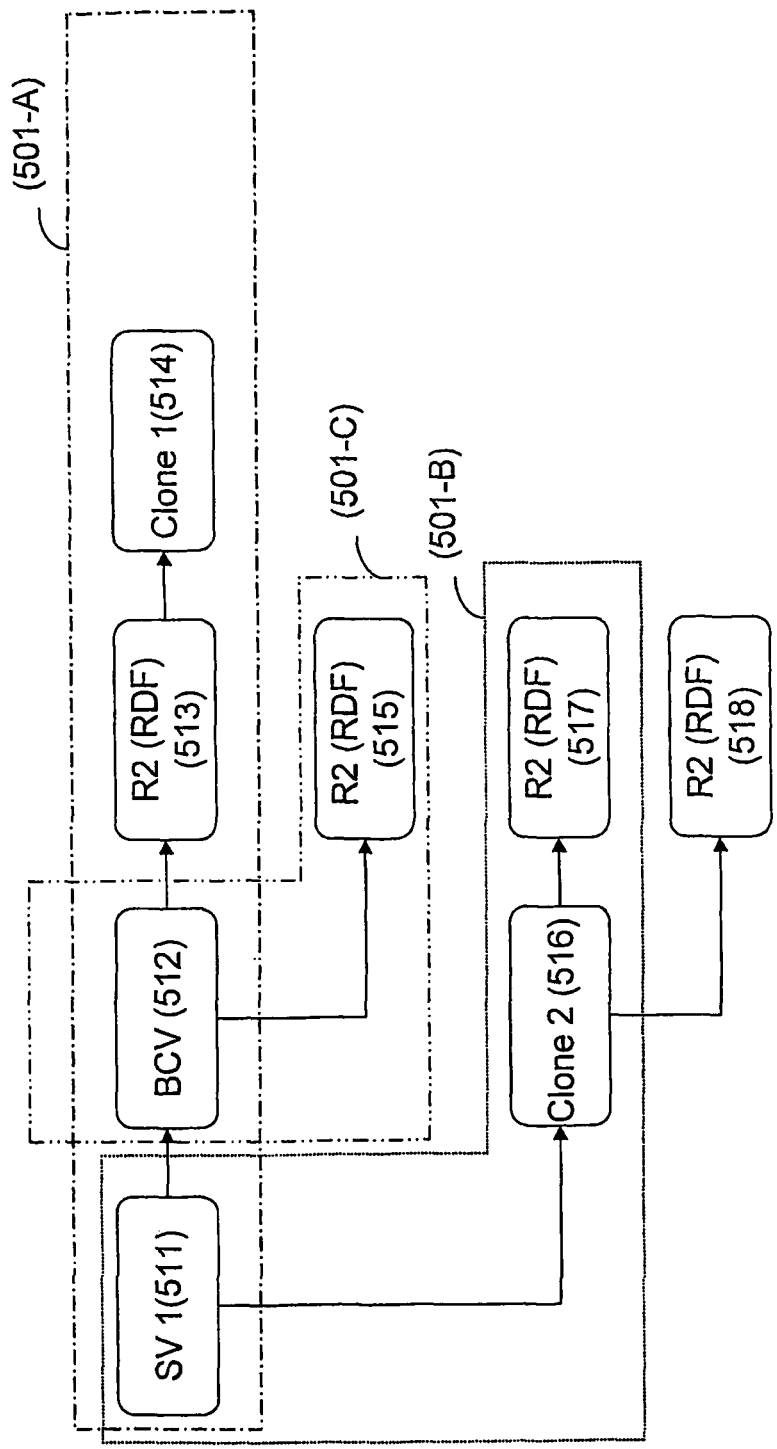
FIGS. 5a-5c illustrate exemplified DP schemes with grouping provided in accordance with certain embodiments of the present invention.
Figure 5B:
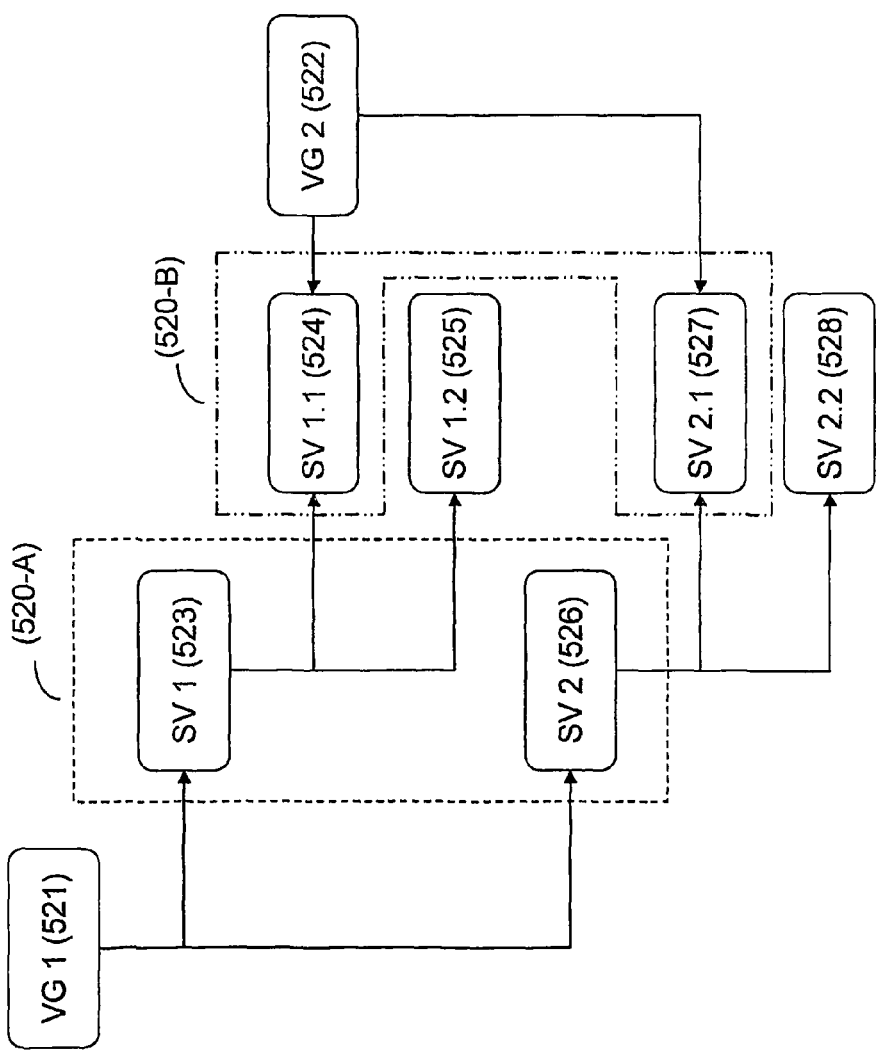
Figure 5C:
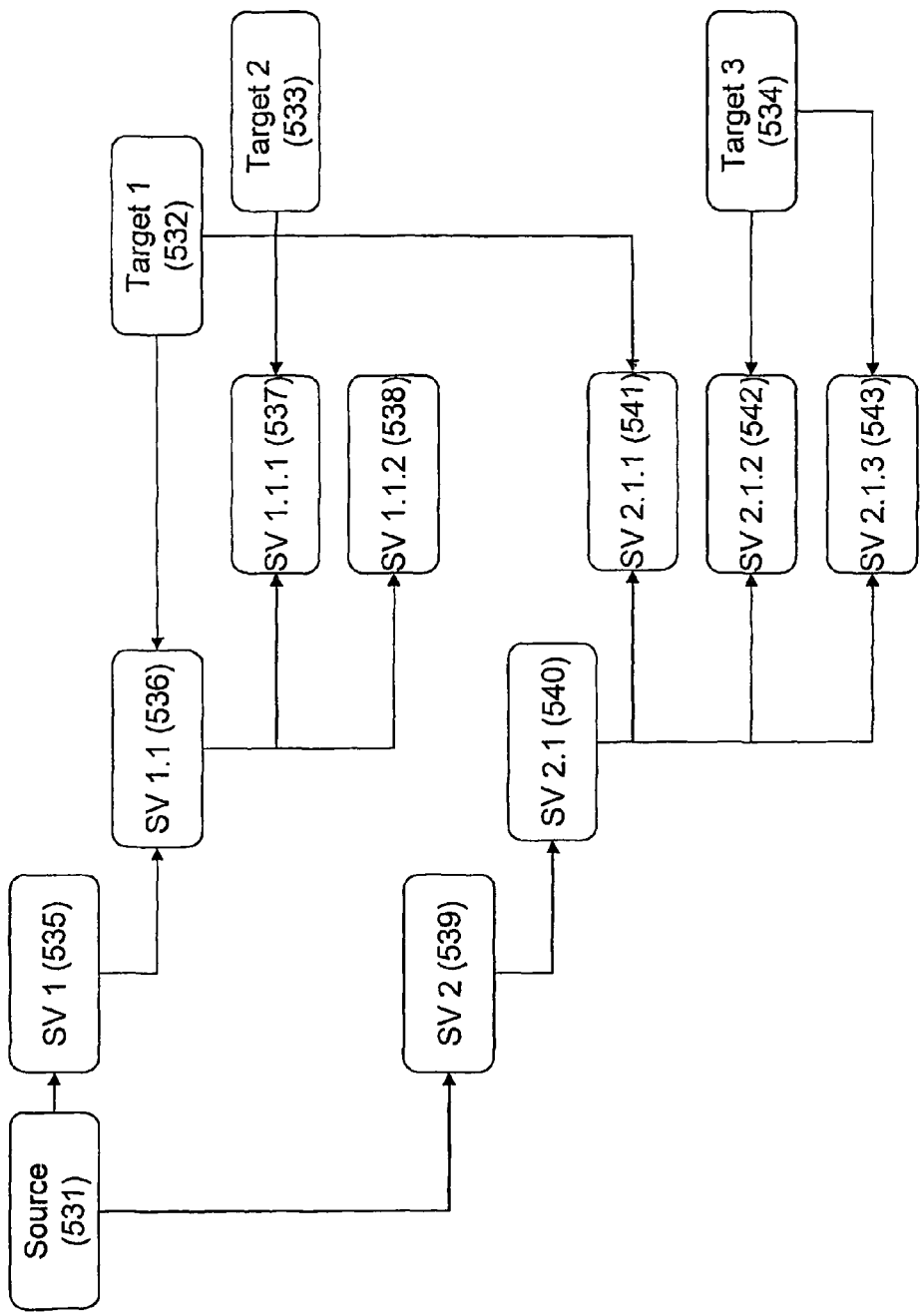

FIG. 5a illustrates a non-limiting example of grouping DP resources comprised in DP scheme in layout paths. In the illustrated example the DP scheme comprises a storage volume SV 1 (511) having two direct copies, each of which has copies of its own in a tree-like fashion. These DP resources may be grouped in several (optionally overlapping) layout paths. For example, a layout path (501-A) between SV 1 (511) and Clone 1 (514), which has a sequence of the following replicas: BCV (512), R2 (RDF) (513) and Clone 1 (514); a layout path (501-B) between SV (511) and R2 (RDF) (517) which has sequence of the following replicas: Clone 2 (516) and R2 (RDF) (517); a layout path (501-C) between BCV (512) and R2 (RDF) (515); etc.

Layout paths can be compared for equality or inequality. For example, the two layout path between SV 1 (511) and SVs (518), (517) are the same (i.e, both paths include Clone replication then RDF replication), while the layout path between SV 1 (511) and SV 515 is different (i.e., path includes BCV—rather than Clone—replication and then RDF).

The condition in the gap profile may be formulated with regard to one or more layout paths, for example the DP gap may be specified as violation of best practice requiring that a parent (not shown), e.g., a Unix VG that is using SVs which are replica of other SVs should have all said replica SVs with the same layout path.

Referring to FIG. 5b, there is illustrated another non-limiting example of is grouping resources in certain DP schemes in accordance with certain embodiments of the present invention.

The illustrated DP scheme comprises two parents VG1 (521) and VG 2 (522). The storage volumes SV1 (523) and SV2 (526) constitute a MGR1 (520-A) associated with VG1, the storage volumes SV1.1 (524) and SV2.1 (527) constitute MGR2 (520-B) associated with VG2. The storage volume SV1.1 (524) is a replica of the storage volume SV1 (523) and there is a layout path between the two. Similarly, another layout path exists between SV2.1 (527) and its replica of SV2 (526). It shall be noted that in the illustrated DP scheme other layout paths exist, and DP resources may be grouped in other ways.

The gap profiles may be specified with respect to one or more illustrated and/or other groups and/or relationship thereof. For example, a gap may exist if an MRG comprises SVs of different types, e.g. if a VG is using SV1 is stored at a local disk and SV2 stored on SAN with mirroring. Such violations may likely result in several problems:
- Performance of the VG will be degraded compared to a VG comprising only mirrored SAN volumes
- Reliability of the VG is significantly reduced compared to a VG comprising only mirrored SAN volumes
- A user may configure replication based on the SAN infrastructure to replicate all SVs in the storage array containing the VG, Doing this, the user may falsely believe that the VG's data is well protected, while in fact, in case of a storage malfunction or disaster, there will be no valid replica of the entire VG, since one of the SVs (the local one) is not, in fact, replicated.

As another example, a gap may exist if an MRG comprises SVs of different update time. Consider SV1.1 (524) and SV2.1 (528) constituting MRG (520-B) associated with VG2 (522). If, for example, SV1.1 (524) had finished its last update at time T1, whereas SV2.1 (528), had finished its last update at time T2, for T1 not equal to T2, then there is a high risk of data inconsistency at VG2 (522).

As another example, a gap may exist if the tree structures (layout paths) deriving from different SVs comprised in MRG (520-A) are not identical. Assume, for example that SV2.2 (528) had been removed, causing the trees deriving from SV1 (523) and SV2 (526) to be different from each other. This, typically, indicates the existence of one of two possible implementation problems: (1) If SV2.2 (528) is not critical for the operation of DP environment, then it logically follows that SV1 (523) has one redundant replica which constitutes a waste; or; (2) if SV2.2 (528) is critical than it should be returned or re-created.

Referring to FIG. 5c, there is illustrated a non-limiting example of grouping resources in yet other DP scheme in accordance with certain embodiments of the present invention.

The illustrated DP scheme comprises four parents: source parent (531) and target parents (532, 533 and 534). The source parent (531) is associated with MRG1 constituted by SV1 (535) and SV2 (539); the $1^{st}$ target parent (532) is associated with MRG2 constituted by storage volumes SV1.1 (536) and SV2.1.1 (541), the $2^{nd}$ target parent (533) is associated with MRG3 constituted by storage volume SV1.1.1 (537), and $3^{rd}$ target parent is associated with MRG4 constituted by storage volumes SV2.1.2 (542) and SV2.1.3 (543). The storage volumes may have several levels of replicas constituting respective layout paths. In accordance with best practice, a target parent should access one replica of each storage volume comprised in NMG1 associated with the source parent, while the said replicas shall have the same layout path (namely, be located on the equivalent places within the replication three). Accordingly, the gap profile may be specified as violation of said best practice.

Matching the illustrated DP scheme to above gap profile results in identifying following gaps:
- The $1^{st}$ target parent (532) accesses SV1.1 (536) and SV 2.1.1 (541) having different layout paths;
- The 2nd parent (533) accesses only replica SV 1.1.1 (537) of SV1 and has no access to a replica of SV2. In accordance with best practice this parent should access also replica of SV2 (539).
- The $3^{rd}$ parent (534) accesses SV 2.1.2 (542) and SV 2.1.3 (543) which are both replicas of SV 2 (539). In accordance with best practice this parent should access one replica of each volume (e.g. SV 2.1.2 (542) and SV 1.1.2 (538)).

Another example of gap analysis may be illustrated by the further detailing the illustrated DP scheme:
Assume that parent (531) is constituted by Oracle Instance wherein data files are accommodated by SV1 (535) and log files and archives are accommodated by SV2 (539);

SV1.1 (536) and SV2.1 (540) are configured as Clones (i.e., point-in-time copies) of SV1 (535) and SV2 (539) respectively;

Assume copy time of the Clones is scheduled according to a common best practice of doing so while the Oracle database is in hot-backup mode.

If the copy time of the clone SV1.1 (536), containing a copy of the data files, is later than the copy time of the Clone SV2.1 (540) containing a copy of the archive and log files, then the set of two Clones might not represent a consistent backup of the Oracle instance, even though it was taken during hot-backup which is a best practice. Accordingly, the gap profile related to the above DP scheme shall comprise comparing the timing of copies with identical layout paths related to different storage volumes within MRG and verifying that the copies containing the database data files are copied before the copies containing the archive and log files.

Figure 6:
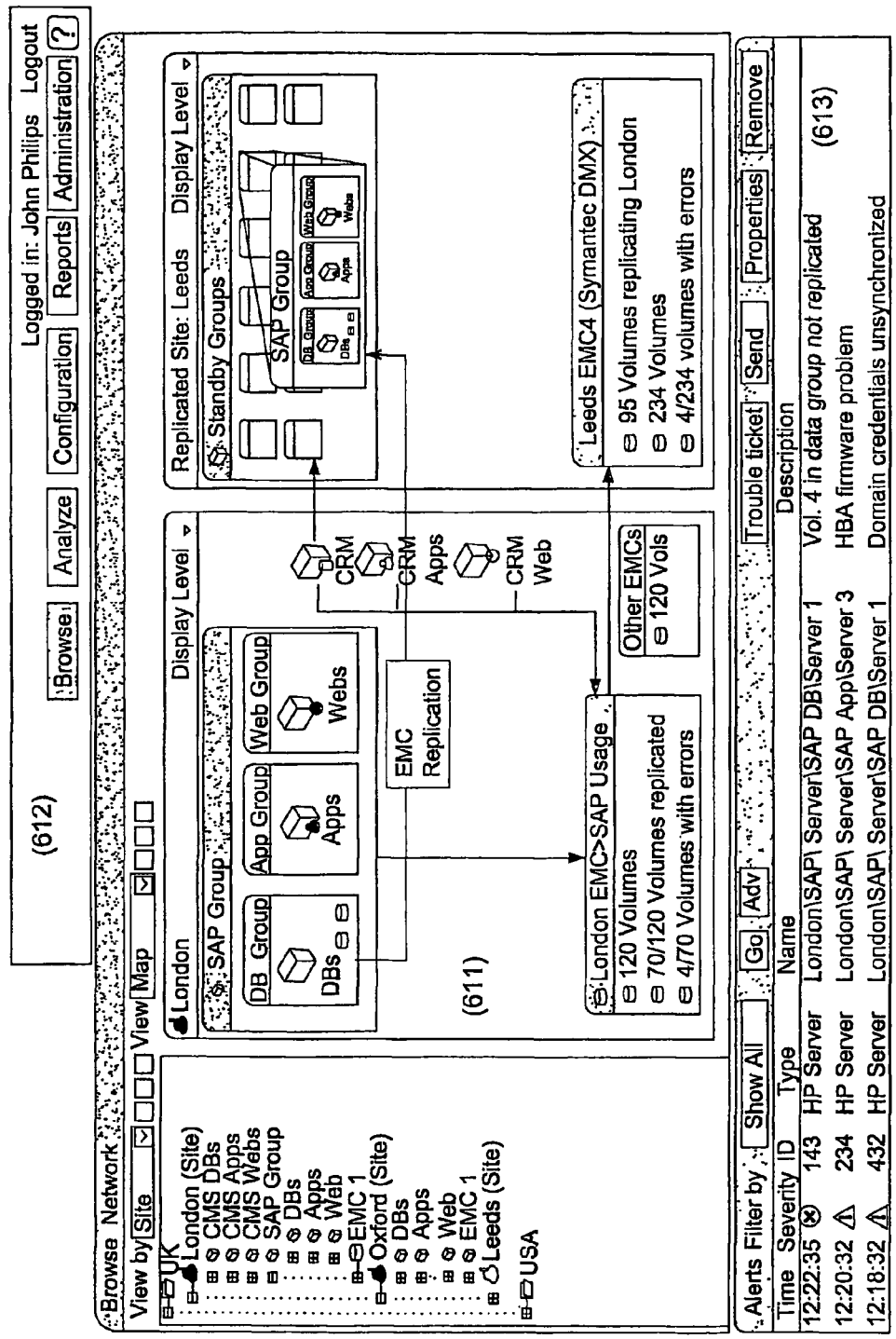
FIG. 6 illustrates a fragment of a sample screen for topology browsing in accordance with certain embodiments of the present invention.

Attention is drawn to FIG. 6, illustrating an exemplary screenshot of the user interface with topology browser. In accordance with certain embodiments of the present invention the DP system is configured to generate a representation of the data accommodated in the object repository DB (collected data and results of analysis) in a form of topology map presenting a layout of DP resources.

The user interface may be configured to comprise a topology browser enabling a user to view the topology map and drill-down into the DP layout at a certain point in time and/or over certain period. The topology browser enables to zoom in and out of scope, to reveal certain resources, characteristics, configuration and relationship thereof, etc. For example, selecting a specific site, application or server via a tree panel (611) provides displaying the selected resource(s) together with dependant standby resources known to the system. Display level menu (612) enables control of zoom and details level. The user interface may be also configured to display data accommodated in the event DB (e.g. alert panel (613)) and associate the presentation of said data with the topology map presentation. For example, selecting alert(s) from the alert panel enables presenting the DP resource(s) related to the alert; and, opposite, selecting DP resource(s) enables presenting alert(s) related to the resource(s).

It is to be understood that the invention is not limited in its application to the details set forth in the description contained herein or illustrated in the drawings. The invention is capable of other embodiments and of being practiced and carried out in various ways. The invention is applicable in a similar manner for identifying gaps in a data protection design.

It should be noted that the invention is not bound by the specific algorithm of processing or specific structure. Those versed in the art will readily appreciate that the invention is, likewise, applicable to any other processing or presentation with equivalent and/or modified functionality which may be consolidated or divided in another manner.

It will also be understood that the invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the appended claims.

The invention claimed is:

1. A method of computerized managing a plurality of data protection (DP) resources by a processor coupled to a non-transitory computer readable memory, the method comprising:
   a) obtaining data related to at least part of the DP resources among said plurality of DP resources, wherein at least part of data is obtained by automated collecting and/or automated processing of the collected data;
   b) accommodating the obtained data in the memory thus giving rise to accommodated data;
   c) processing the accommodated data by the processor, said processing resulting in identifying at least one data protection (DP) scheme characterizing a combination of DP resources and a relationship thereof, wherein said relationship is characterized, at least, by a data protection technique implemented with regard to, at least said combination of DP resources; and
   d) identifying at least one data protection (DP) gap with regard to at least one group of DP resources in said identified DP scheme by the processor, wherein said group of DP resources is other than a layout path characterized by a sequence of storage replication techniques used between a source and a target data accommodating resources, and wherein said DP gap is characterized by a gap profile specified as a combination of said group of DP resources and a condition indicative of one or more predefined DP violations in said group of DP resources.

2. The method of claim 1 wherein identifying one or more DP gaps with regard to said at least one identified DP scheme comprises running at least one rule being characterized by a scope of the rule, an identification condition and an action to be drawn from the rule when the condition is satisfied, wherein the scope of the rule is characterized by said identified DP scheme, and wherein said DP scheme comprises relationship of DP resources other than characterizing a sequence of storage replication techniques used between a source and a target data accommodating resources .

3. The method of claim 1 wherein the processing further comprises running at least one rule for identifying at least one dependency between at least two DP resources among the plurality of DP resources, thereby enabling identifying at least one DP scheme and wherein the condition in the gap profile is related to the identified dependency.

4. The method of claim 1 further comprising automated generation of a topology map presenting a layout of at least part of the DP resources.

5. The method of claim 1 further comprising generation of one or more reports related to identified one or more DP schemes and/or one or more DP gaps.

6. The method of claim 1 wherein said one or more predefined DP violations in the identified DP scheme are other than violations related to a sequence of storage replication techniques used between a source and a target data accommodating resources and are selected from the group comprising:
   inappropriate hardware configuration of at least part of depending DP resources in said group of DP resources;
   inappropriate software configuration of at least part depending DP resources in said group of DP resources;
   data tampering;
   violation of best practice defining constraints on a configuration of at least one DP resource based on the configuration of at least one depending DP resource;
   extended recovery time due to inappropriate configuration of at least one DP resource in said group of DP resources;
   inappropriate configuration of at least one first DP resource causing wrong sequence of events affecting at least one second DP resource in the said group of DP resources, wherein the first and the second resources are not connected by a layout path;
   inappropriate configuration of virtual host environment, said configuration other than layout path configuration; and
   inappropriate configuration of cluster environment, said configuration other than layout path configuration.

7. A computerized method of processing data related to DP resources by a processor coupled to a non-transitory computer readable memory, said processing comprising:
   a) running by the processor at least one rule so as to identify at least one data protection (DP) scheme characterizing a combination of DP resources and a relationship thereof, wherein said relationship is characterized, at least, by a data protection technique implemented with regard to, at least, said combination of DP resources; and b) running by the processor at least one rule so as to identify at least one DP gaps with regard to at least one group of DP resources in said at least one identified DP scheme, wherein said group of DP resources is other than a layout path characterized by a sequence of storage replication techniques used between a source and a target data accommodating resources, wherein said DP gap is characterized by a gap profile specified as a combination of said group of DP resources and a condition indicative of one or more predefined DP violations in said group of DP resources.

8. A system for computerized managing a plurality of data protection (DP) resources, the system comprising:)
  a non-transitory computer readable memory adapted to accommodate data related to at least part of the DP resources among said plurality of DP resources, wherein at least part of data is obtained by automated collecting and/or automated processing of the collected data, thus giving rise to accommodated data;
  a processor operatively coupled to the memory and adapted to process the accommodated data, said processing resulting in identifying at least one data protection (DP) scheme characterizing a combination of DP resources and/ relationship thereof, wherein said relationship is characterized, at least, by a data protection technique implemented with regard to, at least said combination of DP resources; and
  wherein the processor is further configured to identify at least one data protection (DP) gap with regard to at least one group of DP resources in said identified DP scheme, wherein said group of DP resources is other than a layout path characterized by a sequence of storage replication techniques used between a source and a target data accommodating resources; and wherein said DP gap is characterized by a gap profile specified as a combination of said group of DP resources and a condition indicative of one or more predefined DP violations in said group of DP resources.

9. The system of claim 8 wherein the processor is further adapted to run at least one rule to be run for identifying said at least one DP gap with regard to said at least one identified DP scheme, said rule being characterized by a scope of the rule, an identification condition and an action and/or conclusion to be drawn from the rule when the condition is satisfied, wherein the scope of the rule is characterized by said identified DP scheme, and wherein said DP scheme comprises relationship of DP resources other than characterizing a sequence of storage replication techniques used between a source and a target data accommodating resources.

10. The system of claim 8 wherein the processor is further adapted to group at least part of DP resources and relationship thereof characterized by the DP scheme in one or more groups in accordance with certain rules, said rules other than related to a sequence of storage replication techniques used between a source and a target data accommodating resources, wherein conditions specified in the gap profile are configured to be applied to said groups and/or combination thereof.

11. The system of claim 8 wherein the processor is further adapted to process the accommodated data for identifying at least one dependency between at least two DP resources among the plurality of DP resources, thereby enabling identifying at least one DP scheme.

12. The system of claim 8 wherein the processor is further adapted to generate a topology map presenting a layout of at least part of the DP resources.

13. The system of claim 8 further comprising a report generator configured for generating one or more reports related to identified DP scheme and/or DP gap.

14. The system of claim 8 wherein said one or more predefined DP violations in the identified DP scheme are other than violations related to a sequence of storage replication techniques used between a source and a target data accommodating resources and are selected from the group comprising:
  incomplete data between DP resource and respective target DP resource;
  inappropriate hardware configuration of at least part of depending DP resources in said group of DP resources;
  inappropriate software configuration of at least part of DP resources in said group of DP resources;
  a problem of data accessibility and/or data path
  data tampering;
  general violation of best practice defining constraints on a configuration of at least one DP resource based on the configuration of at least one depending DP resource;
  wasting of DP resources;
  extended recovery time due to inappropriate configuration of at least one DP resource in said group of DP resources;
  SLA breaches;
  inappropriate configuration of at least one first DP resource causing wrong sequence of events affecting at least one second DP resource in said group of DP resources, wherein the first and the second resources are not connected by a layout path;
  inappropriate configuration of virtual host environment, said configuration other than layout path configuration;
  inappropriate configuration of cluster environment, said configuration other than layout path configuration.

15. A computer adapted for processing data related to DP resources, said computer comprising a processor operatively coupled to a memory accommodating a plurality of rules, wherein the processor is configured:
  to run at least one rule from said plurality of rules so as to identify at least one data protection (DP) scheme characterizing a combination of DP resources and relationship thereof, wherein said relationship is characterized, at least, by a data protection technique implemented with regard to, at least said combination of DP resources; and
  to run at least one rule from said plurality of rules so as to identify at least one DP gap with regard to said identified at least one DP scheme, wherein said at least one DP gap is characterized by a gap profile specified as a combination of said at least one identified DP scheme, and a condition indicative of one or more predefined DP violations in said DP scheme, said one or more predefined DP violations other than violations related to a sequence of storage replication techniques used between a source and a target data accommodating resources.

16. A computer program product comprising a non-transitory computer readable medium storing computer readable program code for a computer managing a plurality of data protection (DP) resources, the computer program product comprising:
  i) computer readable program code for causing the computer to identify at least one data protection (DP) scheme characterizing a combination of DP resources and relationships thereof, wherein said relationship is characterized, at least, by a data protection technique implemented with regard to, at least said combination of DP resources; and ii) computer readable program code for causing the computer to identify at least one data protection (DP) gap with regard to at least one group of DP resources in said identified data protection scheme, wherein said group of DP resources is other than a layout path characterized by a sequence of storage replication techniques used between a source and a target data accommodating resources; wherein said DP gap is characterized by a gap profile specified as a combination of said at least one group of DP resources, and a condition indicative of one or more predefined DP violations in said group of DP resources.

17. A computerized method of providing a service related to identifying one or more data protection (DP) gaps among a plurality of data protection (DP) resources by a hardware processor, the method comprising:
   a) running by the processor, at least one rule so as to identify at least one data protection (DP) scheme characterizing a combination of DP resources and a relationship thereof, wherein said relationship is characterized, at least, by data protection technique implemented with regard to, at least said combination of DP resources; and
   b) running by the processor, at least one rule so as to identify at least one DP gap, wherein said at least one DP gap is characterized by a gap profile specified as a combination of said at least one identified DP scheme, and a condition indicative of one or more predefined DP violations in said DP scheme, said one or more predefined DP violations other than violations related to a sequence of storage replication techniques used between a source and a target data accommodating resources.

* * * * *